Aug. 23, 1966 M. L. FICKEL 3,267,735
FLUID SAMPLING VALVE
Filed Jan. 14, 1963
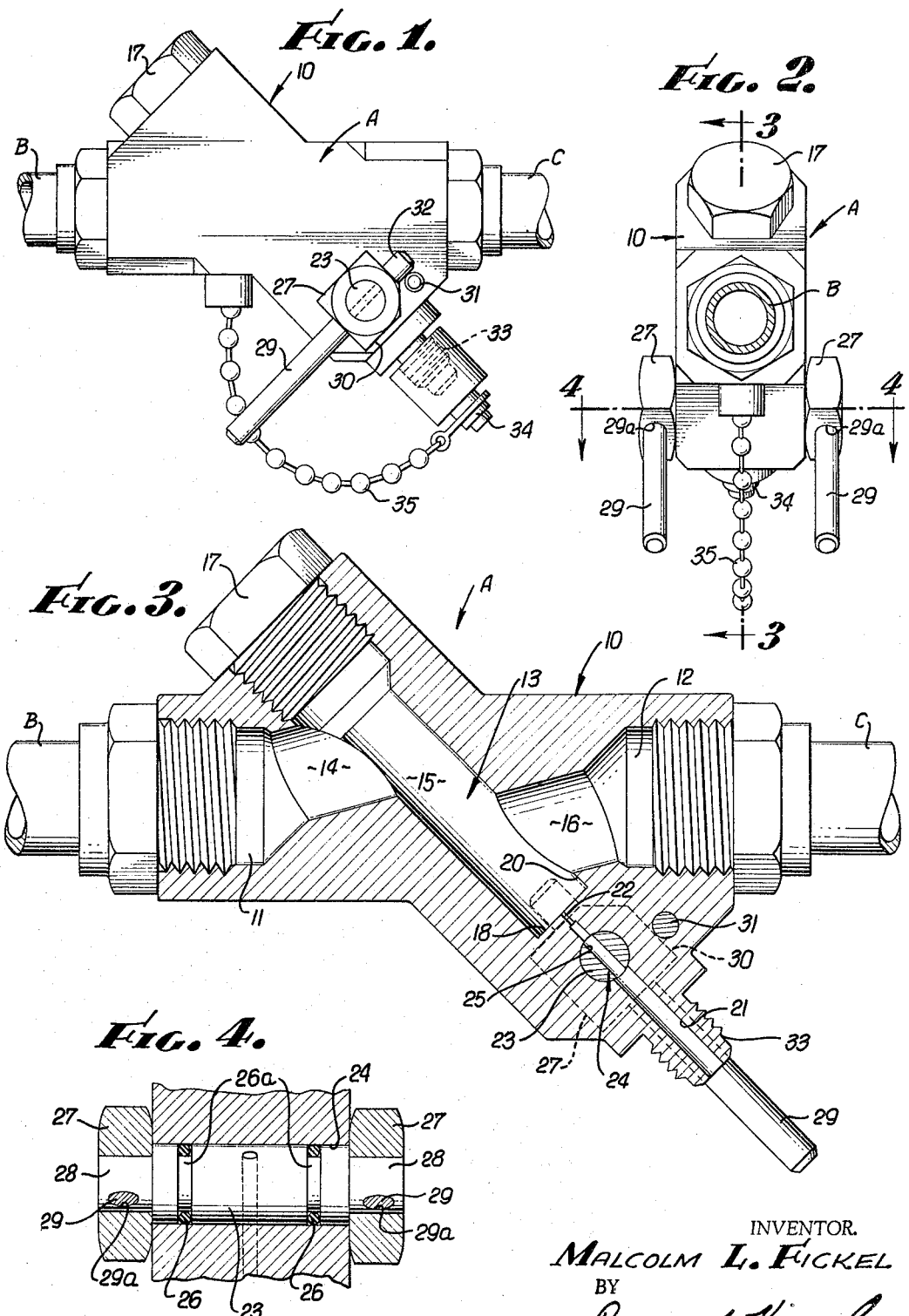
INVENTOR.
MALCOLM L. FICKEL
BY
Bernard Kriegel
ATTORNEY.

United States Patent Office 3,267,735
Patented August 23, 1966

3,267,735
FLUID SAMPLING VALVE
Malcolm L. Fickel, Inglewood, Calif., assignor to Contamination Control Corporation, Los Angeles, Calif., a corporation of California
Filed Jan. 14, 1963, Ser. No. 251,138
7 Claims. (Cl. 73—422)

The present invention relates to apparatus for sampling fluid, and more particularly to apparatus for extracting samples from liquid fluid streams.

Heretofore, it has been difficult to obtain a true sample from a hydraulic system. The undesired procurement of a non-representative sample from a liquid stream flowing through a line is due to many factors, including laminar flow of the liquid in the line, and variations in flow pressures and velocities. If a fluid sample were secured to determine particle contaminants in the stream, such sample was not representative in view of the particle contaminants tending to collect on and move along the wall of the flow line, rather than being dispersed uniformly throughout its cross-section, providing concentrations of contaminants along the wall greater than in another section of the flowing stream.

Accordingly, an object of the present invention is to provide fluid sampling apparatus capable of extracting a valid or true sample from a liquid fluid stream, thereby enabling a representative count to be made of solid contaminants in the liquid stream.

Another object of the invention is to provide fluid sampling apparatus which will enable a true sample to be extracted from a liquid stream at a relatively low rate so that a test sample can be obtained over a specific time period of relatively short or long duration, as desired.

A further object of the invention is to provide fluid sampling apparatus adapted to be disposed in a flow line and capable of securing a true test sample of the fluid in the line with minimum pressure drop through the apparatus.

An additional object of the invention is to provide fluid sampling apparatus capable of extracting a true sample from a liquid fluid stream regardless of its flow rate or pressure.

Yet another object of the invention is to provide fluid sampling apparatus capable of extracting a true sample from a liquid fluid stream by creating turbulence in the fluid and thereby effecting its thorough mixing, particularly at the point of sample extraction, maximum turbulence being obtained with minimum pressure loss.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view of a fluid sampling apparatus embodying the invention disposed in a flow line;

FIG. 2 is an end view of the apparatus, as seen from the left of FIG. 1;

FIG. 3 is an enlarged cross-section taken along the line 3—3 on FIG. 2;

FIG. 4 is an enlarged section taken along the line 4—4 on FIG. 2.

The fluid sampling apparatus A illustrated in the drawings has been designed specifically for sampling a liquid fluid stream flowing in a line B, C. More particularly, it is desired to obtain a true sample from the liquid stream for the purpose of accurate measurement of certain contaminant particles therewithin.

As shown in the drawings, the sampling apparatus includes a valve body 10 having an inlet 11 at one end and an outlet 12 at its other end. The valve body is mounted within a flow line B, C through which a liquid fluid can pass. As shown, an inlet line B is suitably threadedly secured within the inlet 11 of the valve body, and an outlet line C is suitably threadedly secured within the outlet 12 of the body, the inlet and outlet lines B, C being in alignment with one another. Between its inlet and outlet, the valve body contains a mixing chamber 13 having several sections or portions 14, 15, 16 angularly related to one another and to the inlet and outlet of the valve body itself.

The first portion 14 of the fluid mixing chamber extends inwardly of and at an angle to the axis of the valve body inlet 11. Accordingly, the fluid from the inlet is caused to change its direction of flow and, in so doing, a certain amount of turbulence or mixing of the fluid is obtained in the first portion 14. The extent of inclination or angling of the first portion 14 relative to the inlet 11 is made as large as possible, being limited, in the specific device shown in the drawings, by the diameter of the inlet 11 and the size drilling tool (not shown) that can be inserted thereinto at an angle for the purpose of drilling the first passage portion with the desired diameter. As an example, the angularity of the first passage portion 14 relative to the axis of the inlet 11 can be about 15 degrees.

The first passage portion 14 opens into an intermediate passage portion 15 of the mixing chamber, which is inclined to a great extent to the axis of the valve body inlet 11 and outlet 12. The first passage portion 14 opens into the upper part of the intermediate chamber 15, the upper end of this chamber being closed by a suitable plug or closure 17 threaded thereinto. The intermediate chamber 15 is cylindrical in cross-section and is drilled from its upper end, terminating in a flat bottom 18 normal to its axis. It is found that the inclining of the intermediate chamber 15 about 45 degrees to the axis of the body inlet and outlet results in the securing of a true sample from the apparatus. The liquid flowing from the first chamber portion 14 into its intermediate portion 15 must make a severe and abrupt turn or bend. In view of the fact that its direction of flow is changed considerably, additional turbulence is created in the upper portion of the intermediate chamber, insuring a greater extent of mixing of the liquid flowing thereinto. This liquid flows downwardly through the intermediate chamber or passage portion 15 in a downward direction and toward a third passage portion 16 in the valve body 10 communicating with the intermediate portion and also with the outlet 12. This third passage portion 16 deviates angularly to a great extent with respect to the axis of the intermediate passage portion and extends upwardly toward the outlet 12, also being inclined to a substantial extent to the axis of the latter. By way of example, the axis of the third passage portion or mixing chamber 16 can be inclined about 15 degrees to the axis of the valve body outlet 12. If the intermediate passage is inclined 45 degrees to the axis of the inlet and outlet, the angular relationship between the intermediate passage portion and the outlet or third passage portion 16 will be about 120 degrees.

The fluid flowing downwardly through the intermediate passage portion 15 must make another abrupt turn before it passes into the third passage portion 16, thereby creating a large degree of additional turbulence at the meeting regions of these passage portions, and particularly at the lower end of the intermediate passage portion or mixing chamber at its flat bottom 18. The turbulent action continues through the third passage or mixing chamber portion 16 into the outlet 12, the fluid then passing from the valve body outlet into the outlet line C.

To further increase the tubulence of the liquid stream and its mixing at the flat bottom portion 18, the latter is disposed below the third passage portion 16 so as to prevent fluid at the flat bottom portion of the intermediate mixing chamber from passing readily into the third passage portion. Instead, it must flow upwardly along a wall portion 20 at the lower end of the intermediate mixing chamber before entering the third passage portion. This enhances the mixing action at the lower terminus of the intermediate chamber 15, and insures the retention of thoroughly mixed fluid at that point for sampling purposes.

The fluid sample is extracted from the lower end of the intermediate mixing chamber 15. As shown, the valve body has a sampling outlet 21 preferably coaxial with the intermediate chamber 15 and opening thereinto through through its flat bottom portion 18. Preferably, the sampling outlet, where it communicates with the intermediate chamber 15, is a choke orifice 22 of a predetermined size that will permit only smaller particles entrained in the liquid to pass therethrough, since it may be desirable only to measure particles below a certain value that might be present in the fluid stream. The choke orifice 22 opens into the intermediate chamber 15 through its flat bottom 18, the fluid flowing into the enlarged sampling passage or outlet 21. This passage is controlled by a plug valve 23 rotatably mounted in a cylindrical bore 24 in the valve body and extending across the sampling outlet 21. The plug valve has a transverse passage 25 therethrough adapted to be placed inalignment with the passage 21 through the valve body, the passage 21 opening through the outer end of the body.

The plug valve 23 is rotatable in the cylindrical bore 24, leakage of fluid therealong being prevented by suitable side seal rings 26, such as rubber or rubber-like O rings, disposed in peripheral grooves 26a in the plug and sealingly engaging the wall of the bore. The plug valve member 23 is prevented from moving endwise of the valve body and its cylindrical bore 24 by retainers 27 mounted on its trunnions 28 extending outwardly of the body on opposite sides thereof, these retainers being suitably secured to the trunnions, as by inserting operating handles 29 through aligned holes 29a in the retainers and trunnions. The handles 29 can be retained in place by having a press fit in these aligned holes.

The handles 29 may be turned to rotate the plug valve 23 to a position in which its passage 25 is aligned with the sampling passage 21, such as illustrated in FIG. 3. Such aligned position is assured by the engagement of a flat side 30 on each retainer with a stop pin 31 secured to the valve body 10. The closed position of the plug valve, such as disclosed in FIG. 1, in which the plug passage 25 is completely disaligned with the sampling passage 21, is determined by engagement of end portions 32 of the operating handles 29 with the stop pins 31.

The periphery 33 of the valve body at the outlet portion of its sampling passage 21 is threaded to receive a suitable threaded protective cap 34 which will close the outer end of the passage 21 when a sample is not to be taken. To prevent inadvertent loss of the protective cap 34 when unthreaded from the valve body 10, a retaining device, such as a chain 35, may be suitably secured to the cap, the other end of the chain being suitably attached to the valve body 10.

By virtue of the sampling valve illustrated and described, a turbulent flow is created by and within the mixing chamber or flow passage 13 in the valve body 10. A first degree of turbulence is secured because of the inclination of the first passage portion 14 with respect to the body inlet 11, causing a change in direction of the flow at this point. A second large degree of turbulence is obtained in the upper portion of the intermediate passage 15 in view of the necessity of the fluid stream to change its direction of flow to a considerable extent, as, for example, by about 120 degrees in the specific device illustrated in the drawings. A third intimate mixing of the fluid stream occurs at the bottom of the passage portion 15 due to its necessity to make another most pronounced change in flow direction in entering the third portion 16 of the mixing chamber. It is at the flat bottom 18 of the intermediate mixing chamber that a maximum degree of turbulence or mixing occurs, the flow from this region to the third passage portion 16 occurring in turbulent fashion, which turbulence is increased by the necessity for the fluid to pass along the wall 20 at the lower portion of the intermediate chamber before entering the third chamber portion. Again the turbulence is retained in the liquid flowing from the third passage portion 16 into the valve body outlet 12, because of its necessity to again change its angular direction. Despite the extensive turbulence created in the fluid stream, it is found that there is a minimum of pressure loss between the body inlet 11 and outlet 12. The minimum pressure loss is obtained despite relatively high velocity flow of fluid through the sampling apparatus.

By incorporation of the fluid sampling valve in a flow line, a true and valid sample of the liquid flowing therethrough is obtained. The restricted orifice 22 limits the size of the particles in the fluid sample that can pass into the sampling outlet passage 21, since it is not desired to count larger particles. Such restricted orifice also reduces the rate of flow of the liquid through the sampling passage 21, allowing a test sample to be secured over various time periods to further insure that a proper and representative sample is obtained. As an example, the test period can extend for about one minute, after which the plug valve 23 will again be shifted to a closed position. The apparatus A preferably is made with an integral valve body 10, resulting in its compactness and lightness, and capable of use in high pressure lines, as well as in low pressure lines. For example, accurate samples can be obtained of fluids flowing through high pressure lines of 3,000 p.s.i. or 10,000 p.s.i., and even higher.

I claim:
1. In apparatus for sampling fluid flowing through a line: a body through which fluids in the line can flow and having a fluid inlet and a fluid outlet; said body also having a mixing passageway therein between said inlet and outlet, said mixing passageway comprising a first portion communicating with said inlet and having its axis angled substantially with respect to the axis of said inlet, a second portion communicating with said outlet and having its axis angled substantially with respect to the axis of said outlet, and an intermediate portion communicating at one end with said first portion and communicating at its other end with said second portion, said intermediate passageway having its axis angled substantially to the axes of said first and second portions; said body having a sampling passageway communicating with said other end of said intermediate passageway; and means for opening and closing said sampling passageway.

2. In apparatus for sampling fluids flowing through a line: a body through which fluids in the line can flow and having a fluid inlet and a fluid outlet coaxial with said inlet; said body also having a mixing passageway therein between said inlet and outlet, said mixing passageway comprising a first portion communicating with said inlet and having its axis angled substantially with respect to the axis of said inlet and outlet, a second portion communicating with said outlet and having its axis angled substantially with respect to the axis of said inlet and outlet, and an intermediate portion communicating at one end with said first portion and communicating at its other end with said second portion, said intermediate passageway portion having its axis angled substantially to the axes of said first and second portions and also angled substantially with respect to the axis of said inlet and outlet; said body having a sampling passageway communicating with said other end of said intermediate passageway; and means for opening and closing said sampling passageway.

3. In apparatus for sampling fluids flowing through a line: a body through which fluids in the line can flow and having a fluid inlet and a fluid outlet; said body also having a mixing passageway therein between said inlet and outlet, said mixing passageway comprising a first portion communicating with said inlet and having its axis angled substantially with respect to the axis of said inlet, a second portion communicating with said outlet and having its axis angled substantially with respect to the axis of said outlet, and an intermediate portion communicating at one end with said first portion and communicating at its other end with said second portion, said intermediate passageway having its axis angled substantially to the axes of said first and second portions; said body having a sampling passageway communicating with said other end of said intermediate passageway; said sampling passageway including a choke orifice closely adjacent to said mixing passageway; and means for opening and closing said sampling passageway.

4. In apparatus for sampling fluids flowing through a line: a body through which fluids in the line can flow and having a fluid inlet and a fluid outlet coaxial with said inlet; said body also having a mixing passageway therein between said inlet and outlet, said mixing passageway comprising a first portion communicating with said inlet and having its axis angled substantially with respect to the axis of said inlet and outlet, a second portion communicating with said outlet and having its axis angled substantially with respect to the axis of said inlet and outlet, and an intermediate portion communicating at one end with said first portion and communicating at its other end with said second portion, said intermediate passageway portion having its axis angled substantially to said axes of said first and second portions and also angled substantially with respect to the axis of said inlet and outlet; said body having a sampling passageway communicating with said other end of said intermediate passageway; said sampling passageway including a choke orifice adjacent to said mixing passageway; and means for opening and closing said sampling passageway.

5. In apparatus for sampling fluids flowing through a line: a body through which fluids in the line can flow and having a fluid inlet and a fluid outlet coaxial with said inlet; said body also having a mixing passageway therein between said inlet and outlet, said mixing passageway comprising a first portion communicating with said inlet and having its axis angled substantially with respect to the axis of said inlet and outlet, a second portion communicating with said outlet and having its axis angled substantially with respect to the axis of said inlet and outlet, and an intermediate portion communicating at one end with said first portion and communicating at its other end with said second portion, said intermediate passageway portion having its axis angled substantially to the axes of said first and second portions, the axis of said intermediate portion being angled at about 45 degrees to the axis of said inlet and outlet; said body having a sampling passageway communicating with said other end of said intermediate passageway; and means for opening and closing said sampling passageway.

6. In apparatus for sampling fluids flowing through a line: a body through which fluids in the line can flow and having a fluid inlet and a fluid outlet; said body also having a mixing passageway therein between said inlet and outlet, said mixing passageway comprising a first portion communicating with said inlet and having its axis angled substantially with respect to the axis of said inlet, a second portion communicating with said outlet and having its axis angled substantially with respect to the axis of said outlet, and an intermediate portion communicating at one end with said first portion and communicating at its other end with said second portion, said intermediate passageway having its axis angled substantially to the axes of said first and second portions; said intermediate passageway terminating at said other end in a body wall normal to the axis of said intermediate passageway; said body having a sampling passageway opening through said body wall into said intermediate passageway; and means for opening and closing said sampling passageway.

7. In apparatus for sampling fluids flowing through a line: a body through which fluids in the line can flow and having a fluid inlet and a fluid outlet coaxial with said inlet; said body also having a mixing passageway therein between said inlet and outlet, said mixing passageway comprising a first portion communicating with said inlet and having its axis inclined upwardly therefrom at a substantial angle to the axis of said inlet and outlet, a second passageway portion communicating with said outlet and having its axis inclined downwardly therefrom substantially with respect to the axis of said inlet and outlet, and an intermediate passageway portion communicating at its upper end with said first portion and communicating at its lower end with said second portion, said intermediate passageway having its axis angled at about 45 degrees to the axis of said inlet and outlet; said intermediate passageway terminating at its lower end in a body wall substantially normal to the axis of said intermediate passageway; said body having a sampling passageway opening through said body wall into said intermediate passageway, said sampling passageway including a choke orifice closely adjacent to said body well; and means for opening and closing said sampling passageway.

References Cited by the Examiner

UNITED STATES PATENTS

| | | | |
|---|---|---|---|
| 1,156,432 | 10/1915 | Peavey | 138—42 X |
| 1,323,048 | 11/1919 | Goodwin | 251—127 X |
| 1,649,399 | 11/1929 | Gard | 73—422 |
| 1,825,807 | 10/1931 | Martin | 251—142 X |
| 2,322,018 | 6/1943 | Huber | 73—422 X |
| 2,461,045 | 2/1949 | Fairbain | 73—422 |

RICHARD C. QUEISSER, *Primary Examiner.*

JOSEPH P. STRIZAK, *Examiner.*

S. CLEMENT SWISHER, JERRY W. MYRACLE,
*Assistant Examiners.*